United States Patent [19]
Park et al.

[11] Patent Number: 5,715,244
[45] Date of Patent: Feb. 3, 1998

[54] RECEIVING APPARATUS FOR A BASE STATION IN A CODE DIVISION MULTIPLE ACCESS SYSTEM AND SIGNAL RECEIVING METHOD THEREFOR

[75] Inventors: Jong-Hyeon Park, Seoul; Je-Woo Kim, Suwon, both of Rep. of Korea

[73] Assignee: SamSung Electronics Co., Ltd., Suwon, Rep. of Korea

[21] Appl. No.: 562,554

[22] Filed: Nov. 24, 1995

[30] Foreign Application Priority Data

Nov. 25, 1994 [KR] Rep. of Korea .................. 31163/1994

[51] Int. Cl.$^6$ .................................................. H04B 7/216
[52] U.S. Cl. ...................................... 370/335; 370/515
[58] Field of Search ..................................... 370/320, 335, 370/342, 441, 514, 515; 375/208, 267, 346, 347; 455/132, 134, 135, 136, 137

[56] References Cited

U.S. PATENT DOCUMENTS 5,218,619 6/1993 Dent ............................... 370/342
5,341,395 8/1994 Bi ................................... 370/342
5,598,428 1/1997 Sato ................................ 375/347

*Primary Examiner*—Douglas W. Olms
*Assistant Examiner*—Ajit Patel
*Attorney, Agent, or Firm*—Robert E. Bushnell, Esq.

[57] ABSTRACT

A receiving apparatus for a base station in a code division multiple access (CDMA) system performs a signal receiving method, and includes a pseudo-noise code generator that generates a pseudo-noise code corresponding to each receiving stage of a plurality of channels. A demodulator sequentially demodulates a received signal into baseband data according to the receiving stage in synchronization with the pseudo-noise code. A re-modulator re-modulates the baseband data to a signal of a channel corresponding to each mobile station in synchronization with a delayed pseudo-noise code.

33 Claims, 8 Drawing Sheets

RECEIVING APPARATUS FOR A BASE STATION IN A CODE DIVISION MULTIPLE ACCESS SYSTEM AND SIGNAL RECEIVING METHOD THEREFOR

CROSS-REFERENCE TO RELATED APPLICATIONS

This application makes reference to, incorporates the same herein, and claims all benefits accruing under 35 U.S.C. §119 from an application for *Receiving Apparatus For A Base Station Of A Code Division Multiple Access System And Signal Receiving Method Therefor* earlier filed in the Korean Industrial Property Office on 25 Nov. 1994 and them assigned Ser. No. 31163/1994.

BACKGROUND OF THE INVENTION

The present invention relates to a receiving apparatus for a base station in a cellular system, and more particularly to a receiving apparatus for a base station in a direct sequence/ code division multiple access (DS/CDMA) system and a signal receiving method therefor.

Code division multiple access (CDMA) systems provide many advantages over the conventional frequency division multiple access (FDMA) and time division multiple access (TDMA) systems. In particular, with code division multiple access (CDMA), there are no restrictions on time or bandwidth. That is, data transmissions can be performed at any time and can occupy any or all of the bandwidth allocated to a particular system. Because there is no limitation on the bandwidth, code division multiple access (CDMA) is sometimes referred to as spread spectrum multiple access (i.e., data transmissions can spread throughout the entire allocated bandwidth spectrum). Transmissions are separated through envelope encryption and decryption techniques.

One prior art reference that utilizes the code division multiple access (CDMA) communication technique is disclosed in U.S. Pat. No. 5,442,662 entitled *Code Division Multiple Access Communication System Providing Enhanced Capacity Within Limited Bandwidth* issued to Fukasawa et al. on 15 Aug. 1995. In Fukasawa et al. '662, a receiver is provided wherein a received signal is demodulated by parallel multiplication with two carrier signals. The resulting baseband signals are correlated with two spreading codes, and the results are added. While conventional art, such as Fukasawa et al. '662, provides advantages over the frequency division multiple access (FDMA) and time division multiple access (TDMA) systems mentioned above, we believe that an improved code division multiple access (CDMA) receiver can be contemplated to eliminate interference between data signals sent from a plurality of mobile stations, and to easily regenerate data irrespective of the magnitude of power used by the plurality of mobile stations to transmit the data.

SUMMARY OF THE INVENTION

It is therefore an object of the present invention to provide an improved receiving apparatus for a base station in a code division multiple access (CDMA) system.

It is another object to provide a receiving apparatus for a base station in a code division multiple access (CDMA) system that easily regenerates data through a plurality of channels respectively corresponding to a plurality of mobile stations.

It is still another object to provide a receiving apparatus for a base station in a code division multiple access (CDMA) system that easily regenerates data irrespective of the magnitude of power used by a plurality of mobile stations to transmit the data.

It is yet another object to provide a receiving apparatus for a base station in a code division multiple access (CDMA) system which rejects interference between data signals sent from a plurality of mobile stations.

It is still yet another object to provide a receiving apparatus for a base station in a code division multiple access (CDMA) system which accommodates an increased quantity of data sent from a plurality of mobile stations.

To achieve these and other objects, the present invention provides a receiving apparatus for a base station in a code division multiple access (CDMA) system that includes a pseudo-noise code generator for generating a pseudo-noise code corresponding to each receiving stage of a plurality of channels, a demodulator for sequentially demodulating a received signal into baseband data according to the receiving stage in synchronization with the pseudo-noise code, and a re-modulator for re-modulating the baseband data into a signal of a channel corresponding to each mobile station in synchronization with a delayed pseudo-noise code.

The receiving apparatus of the present invention performs a receiving method by sequentially demodulating a received signal into baseband data in synchronization with a pseudo-noise code corresponding to each receiving stage of a plurality of channels, re-modulating the baseband data into a signal of a channel corresponding to each mobile station by multiplying a delayed pseudo-noise code by the baseband data, and rejecting an interference component caused by cross correlation with other channels from the signal of a corresponding channel generated in the re-modulating step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
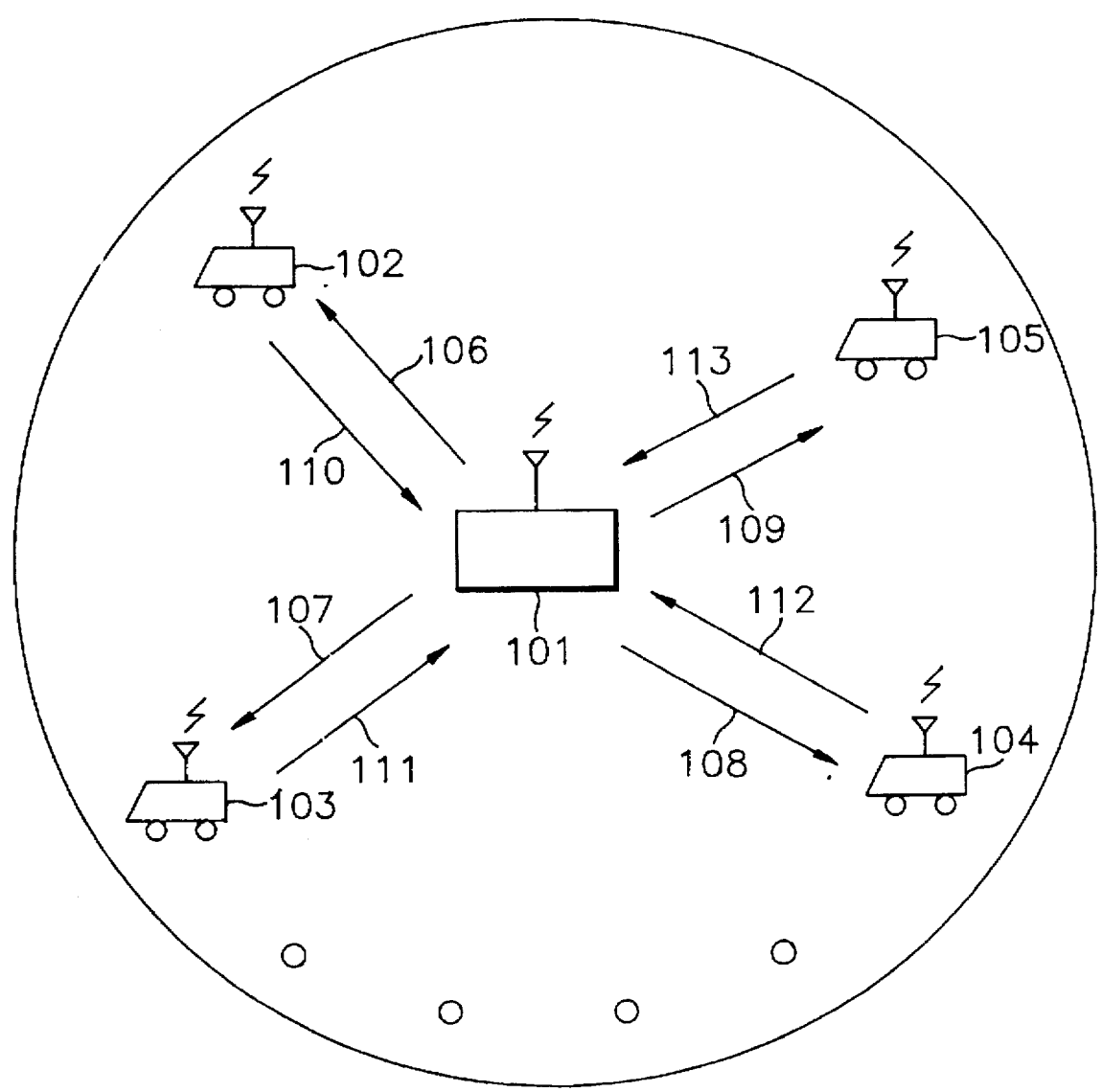
FIG. 1 shows up-link and down-link channel structure in a direct sequence/code division multiple access (DS/CDMA) cellular system.

Turning now to the drawings and referring to FIG. 1, a cellular system employing direct sequence/code division multiple access (DS/CDMA) is shown. In FIG. 1, down-link channels 106–109 are connected to mobile stations 102–105 from a base station 101, and up-link channels 110–113 are connected to base station 101 from mobile stations 102–105.

Figure 2:
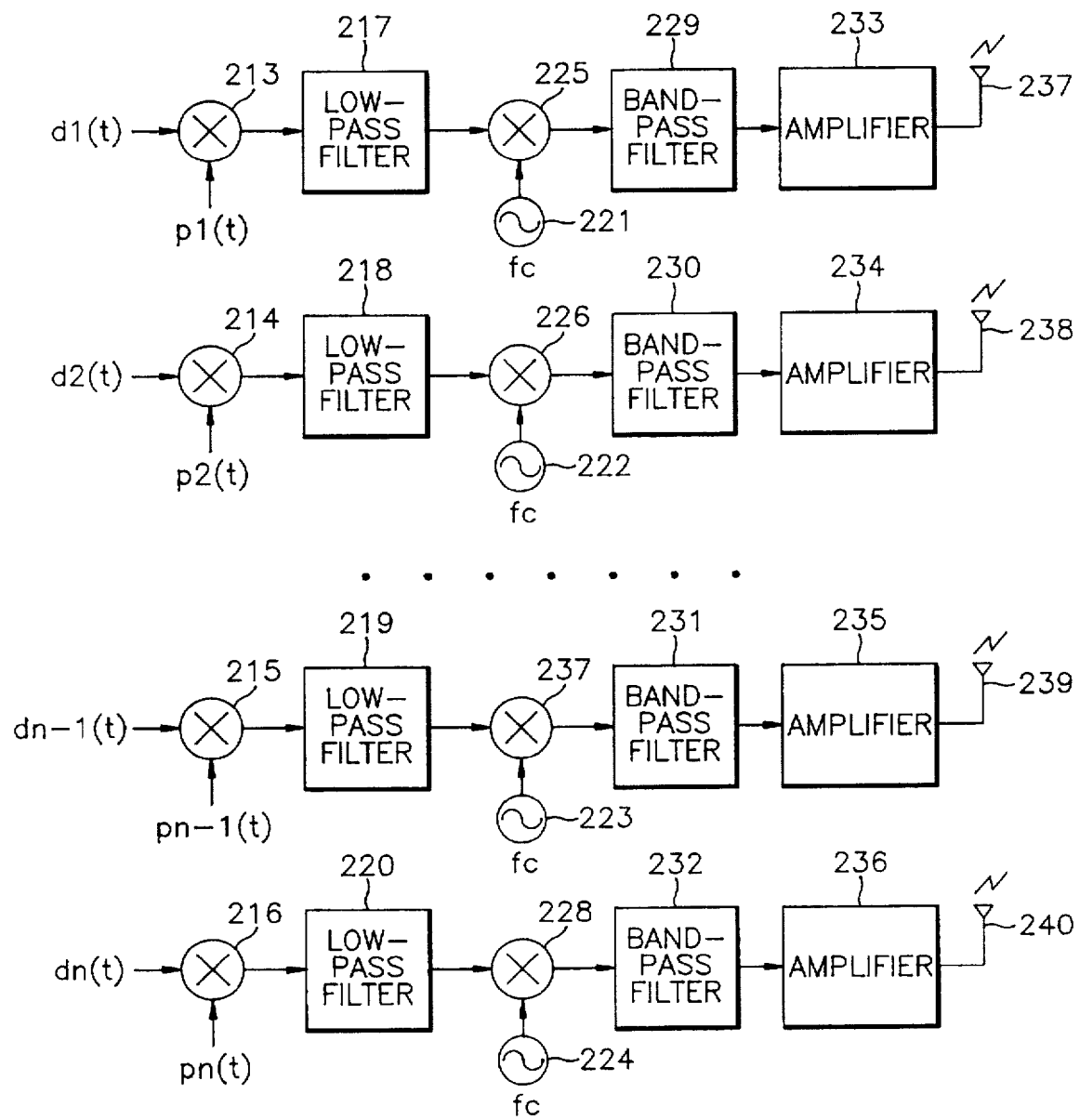
FIG. 2 shows a transmitter for a mobile station performing an up-link connection in a direct sequence/code division multiple access (DS/CDMA) cellular system.

In direct sequence/code division multiple access (DS/CDMA) cellular systems, the up-link connection, rather than the down-link connection, is most likely to cause problems. A transmitter for a mobile station performing the up-link connection in a direct sequence/code division multiple access (DS/CDMA) system is shown in FIG. 2. Assuming that n mobile stations transmit data to the base station, n baseband data signals d1(t)-dn(t) are spread in spreading units (i.e., multipliers) 213–216 by pseudo-noise codes p1(t)-pn(t) for corresponding channels of the mobile stations. The pseudo-noise codes p1(t)-pn(t) are an important factor in determining each channel in the direct sequence/code division multiple access (DS/CDMA) system, and are generally assigned from the base station.

The spread signals generated from spreading units 213–216 are low-pass filtered in low-pass filters 217–220 and mixed in mixers 225–228 with a carrier wave $f_C$ of the same frequency generated by carrier wave generators 221–224, respectively. The mixed signals pass through band-pass filters 229–232 and amplifiers 233–236 and are propagated to free space through antennas 237–240, respectively. In the up-link connection, the base station receives signals transmitted from the mobile stations and demodulates the baseband data signals d1(t)-dn(t).

Figure 3:
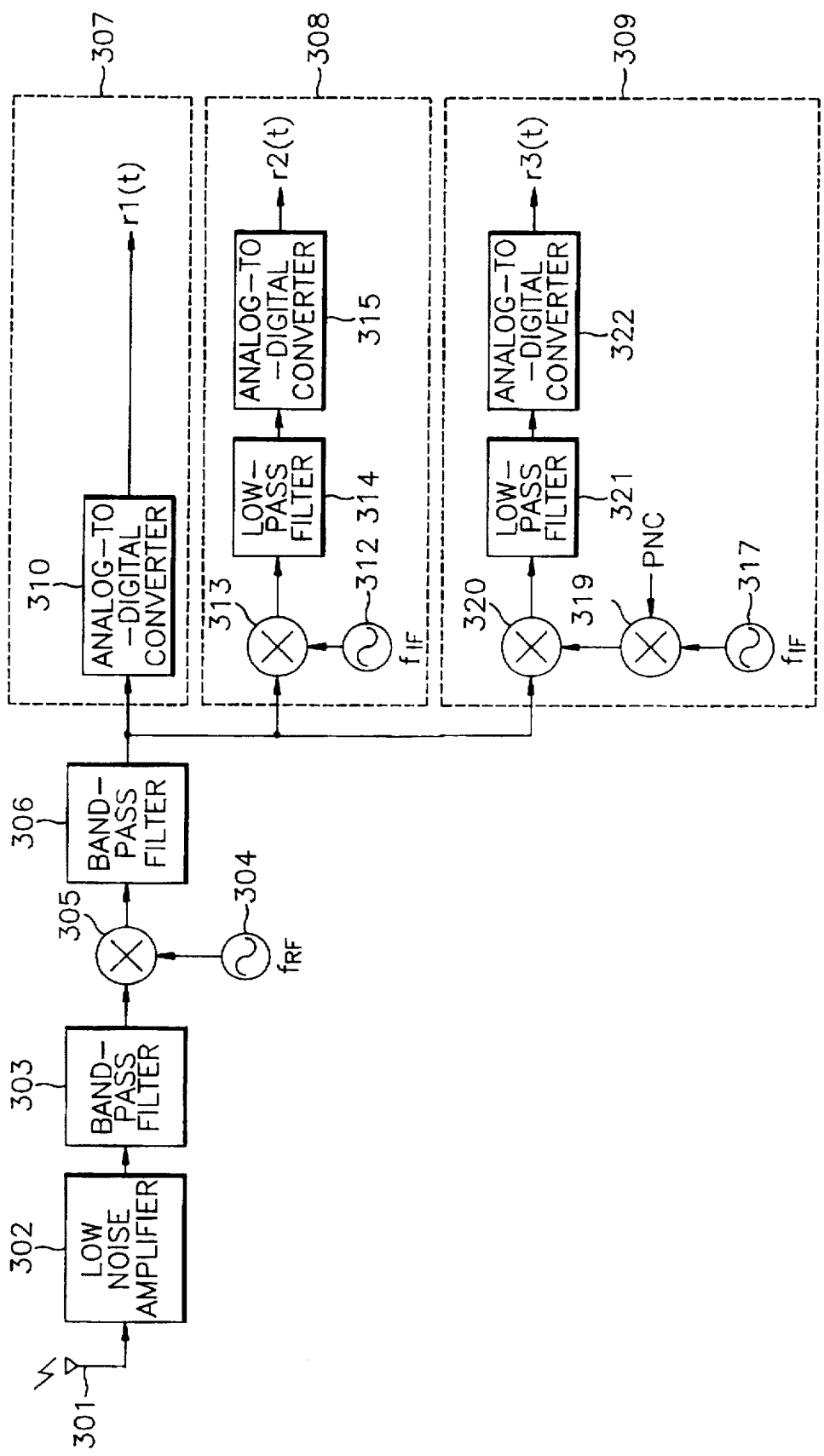
FIG. 3 shows partial receiver structure for a base station performing an up-link connection in a direct sequence/code division multiple access (DS/CDMA) cellular system.

FIG. 3 shows partial receiver structure for a base station performing the up-link connection in a direct sequence/code division multiple access (DS/CDMA) cellular system.

The base station receives a signal transmitted from each mobile station through an antenna 301. The received signal passes through a low noise amplifier 302 and a band-pass filter 303. The signal of a carrier wave frequency band passing through band-pass filter 303 is then mixed in a mixer 305 with a radio frequency $f_{RF}$ generated from a radio frequency generator 304 and further passes through a band-pass filter 306, to produce a signal of an intermediate frequency band. If the carrier wave frequency is $f_C$, the radio frequency is $f_{RF}$, and the intermediate frequency is $f_{IF}$, then $f_C = f_{RF} + f_{IF}$.

The receiver structure of the base station depends on how a signal processor at a rear end processes the signal of the intermediate frequency band. Block 307 represents a signal processor for the intermediate frequency band. Blocks 308 and 309 represent signal processors for a baseband (i.e., spread signal band).

In signal processor 307 for the intermediate frequency band, the output of band-pass filter 306 is converted into a digital signal r1(t) by an analog-to-digital converter 310. The signal r1(t) is used for implementing signal processing for de-spreading, initial synchronization, synchronous tracking and baseband data demodulation, etc.

In signal processor 308 for the baseband, the output of band-pass filter 306 is mixed in a mixer 313 with an intermediate frequency $f_{IF}$ generated by an intermediate frequency generator 312. The mixed signal is then passed through a low-pass filter 314, and is converted into a digital signal r2(t) by an analog-to-digital converter 315. The signal r2(t) is used for implementing signal processing for de-spreading, initial synchronization, synchronous tracking and baseband data demodulation, etc.

In signal processor 309 for the baseband, an intermediate frequency $f_{IF}$ generated by an intermediate frequency generator 317 is mixed in a mixer 319 with a reference pseudo-noise code (PNC). The mixed signal is further mixed in a mixer 320 with the output of band-pass filter 306. The output of mixer 320 is then passed through a low-pass filter 321, and is converted into a digital signal r3(t) by an analog-to-digital converter 322. The rear end of the receiver performs signal processing using the signal r3(t) to demodulate the baseband data.

Figure 4:
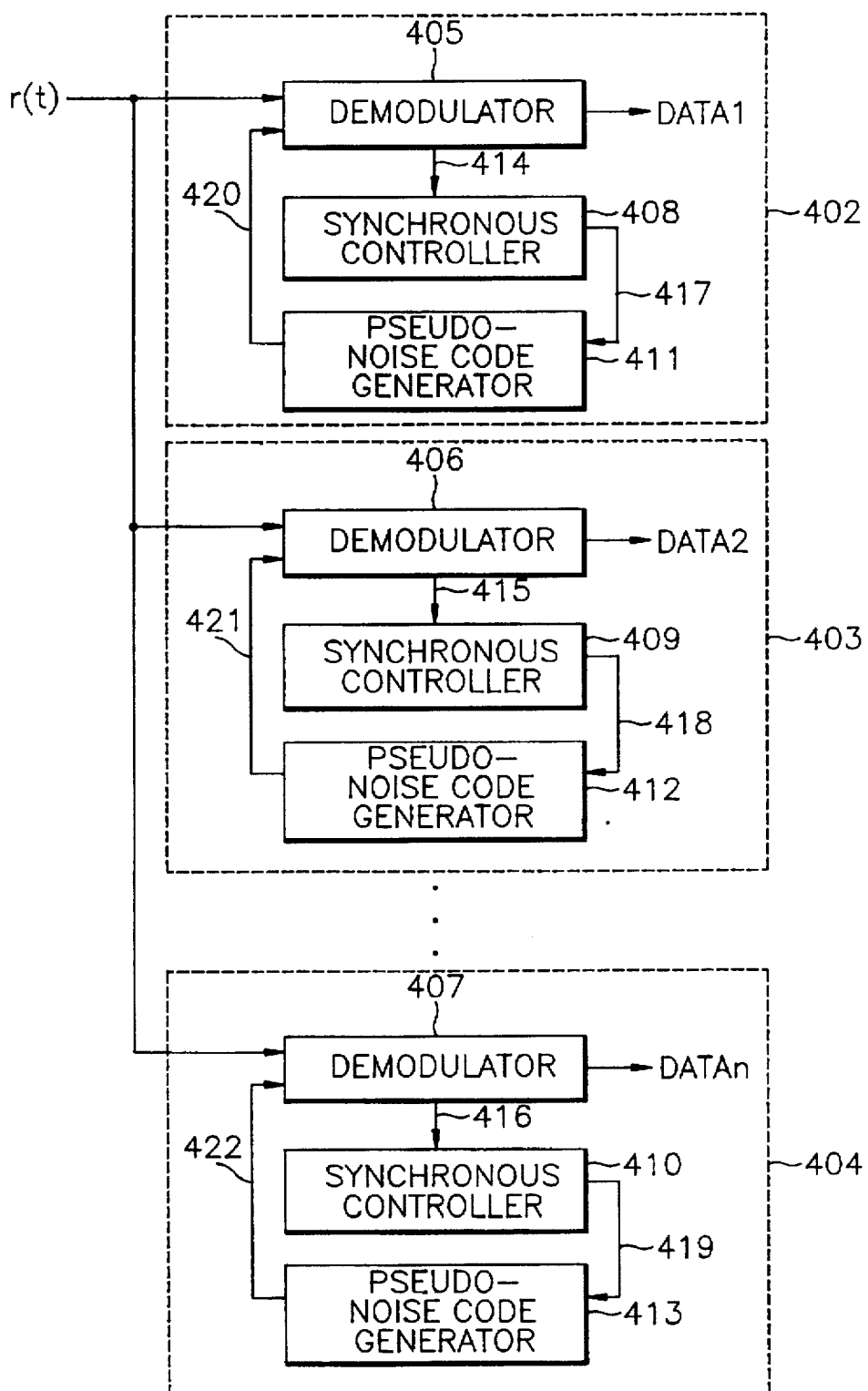
FIG. 4 shows further receiver structure for a base station in a direct sequence/code division multiple access (DS/CDMA) cellular system.

The receiver of the base station demodulates the baseband data signals corresponding to n mobile stations using signals r1(t), r2(t) and r3(t). FIG. 4 shows the general structure of the receiver for demodulating the baseband data of each mobile station by processing the signals r1(t), r2(t) and r3(t) of FIG. 3. In FIG. 4, r(t) represents signals r1(t), r2(t) or r3(t) of FIG. 3 and is simultaneously provided to signal processors 402–404 of each channel corresponding to n mobile stations to demodulate the baseband data signals of the n mobile stations. Signal processors 402–404 of each channel have the same structure and operation, except that they generate different pseudo-noise codes.

In the operation for demodulating n data signals for n channels, the signal r(t) in which signals of n mobile stations are mixed is provided to demodulators 405–407 of signal processors 402–404 of the n channels. Demodulators 405–407 perform signal processing using pseudo-noise codes 420–422 which are output from pseudo-noise code generators 411–413 of each channel.

Demodulators 405–407 each include a de-spreading unit, an initial synchronizer, a synchronous tracer, and a baseband data demodulator. The de-spreading unit converts a spread signal into a baseband signal. The initial synchronizer adjusts code synchronization between a signal component of its own channel from the mixed signal r(t) and the reference pseudo-noise code (PNC) within one chip. Once the initial synchronization is established, the synchronous tracer continues to maintain the code synchronization between the signal component of its own channel and the reference pseudo-noise code (PNC) within one chip. The outputs 414–416 of the de-spreading unit, the initial synchronizer and the synchronous tracer of each of the demodulators 405–407 are monitored by synchronous controllers 408–410. Synchronous controllers 408–410 generate control signals 417–419 to control internal clocks of pseudo-noise code generators 411–413. Thus, the pseudo-noise codes (PNCs) are generated at a controlled speed.

If the initial synchronization is established by the de-spreading units and initial synchronizers, demodulators 405–407 begin to demodulate baseband data signals DATA1, DATA2 and DATAn, and the synchronous tracer begins an operation to maintain code synchronization. The operation of de-spreading, initial synchronization, synchronous tracking and baseband data demodulation continues until a call of a channel is completed.

The direct sequence/code division multiple access (DS/CDMA) cellular system described above with reference to FIGS. 1 through 4 has many advantages over a frequency division multiple access (FDMA) cellular system or a time division multiple access (TDMA) cellular system. To ensure high performance of the direct sequence/code division multiple access (DS/CDMA) system, careful attention must be paid during design. In particular, precise power control is required to overcome problems associated with "near-far" effects. "Near-far" effects give rise to serious problems in the up-link connection, rather than the down-link connection. Hence, the output power of the plurality of mobile stations should be carefully controlled.

Precise power control, however, often requires use of control techniques that impose a heavy burden on network operation. If a precise power control system is not utilized, communication between the mobile stations and the base station can be destroyed.

Although the channel capacity of the direct sequence/code division multiple access (DS/CDMA) system is much higher than that of the frequency division multiple access (FDMA) system or the time division multiple access (TDMA) system, it can not be increased without limitation. That is, if the number of channels is increased beyond a certain point, the additional channels can adversely affect adjacent channels and cause signal interference, even if the power is precisely controlled. Therefore, in the code division multiple access (CDMA) system, the number of channels can not be increased infinitely due to signal interference between channels. Moreover, even if there is an increase in the number of channels within a permissible range, the generation of additional signal interference can cause an increased number of errors in demodulating the baseband data at the receiving end.

Figure 5A:
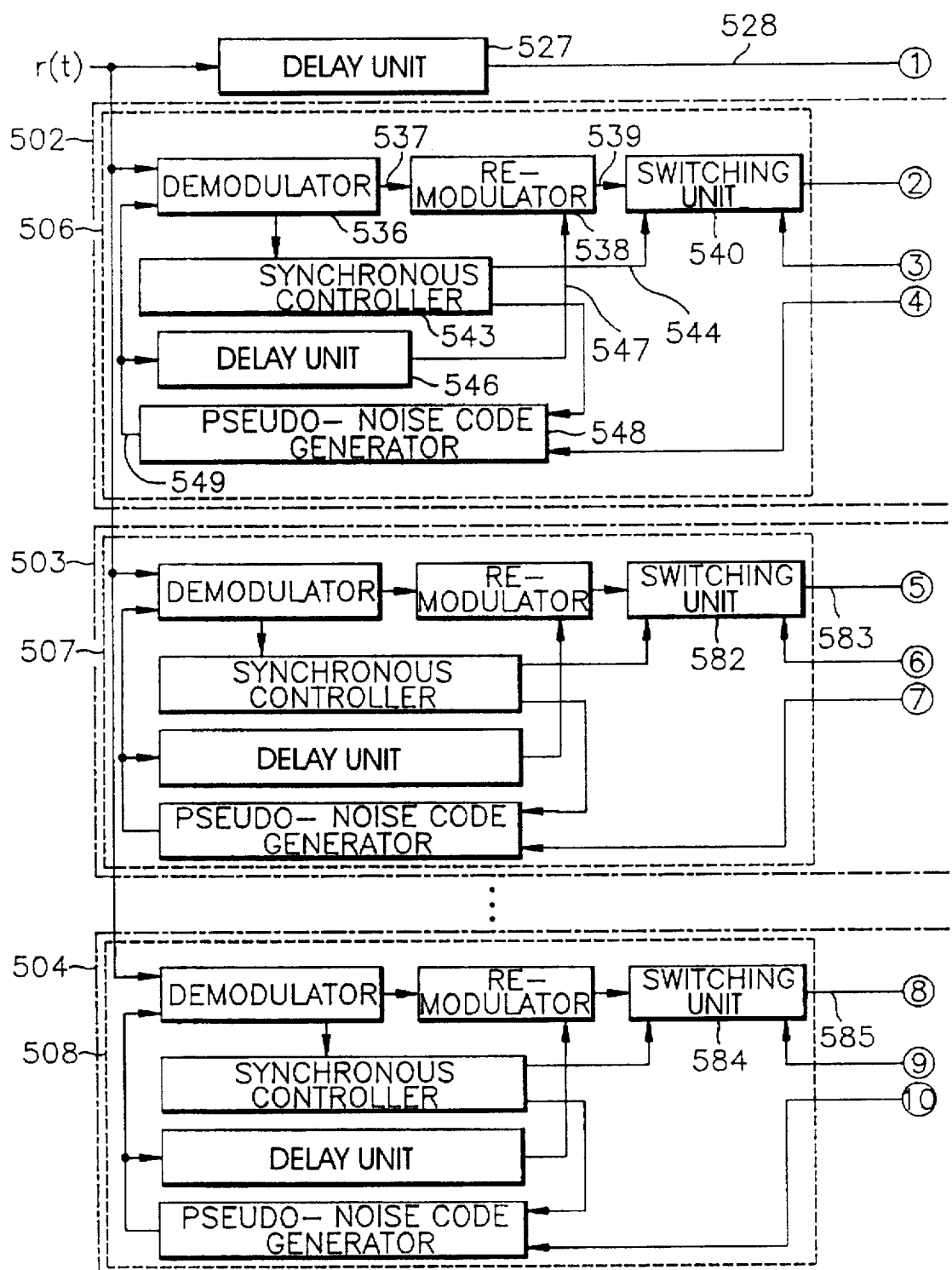
FIGS. 5A–5C show a receiver for a base station in a direct sequence/code division multiple access (DS/CDMA) cellular system constructed according to the principles of the present invention.
Figure 5B:
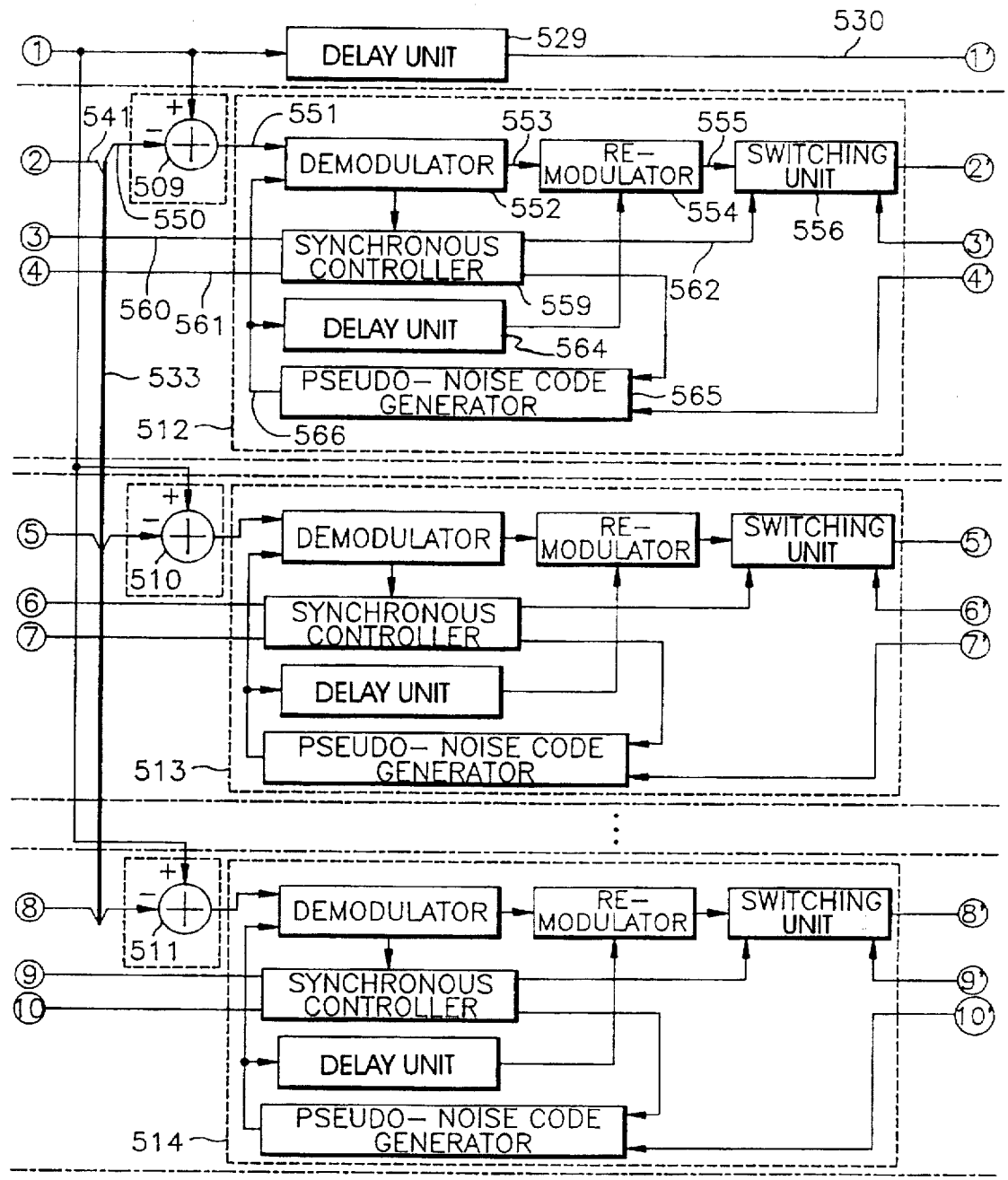
Figure 5C:
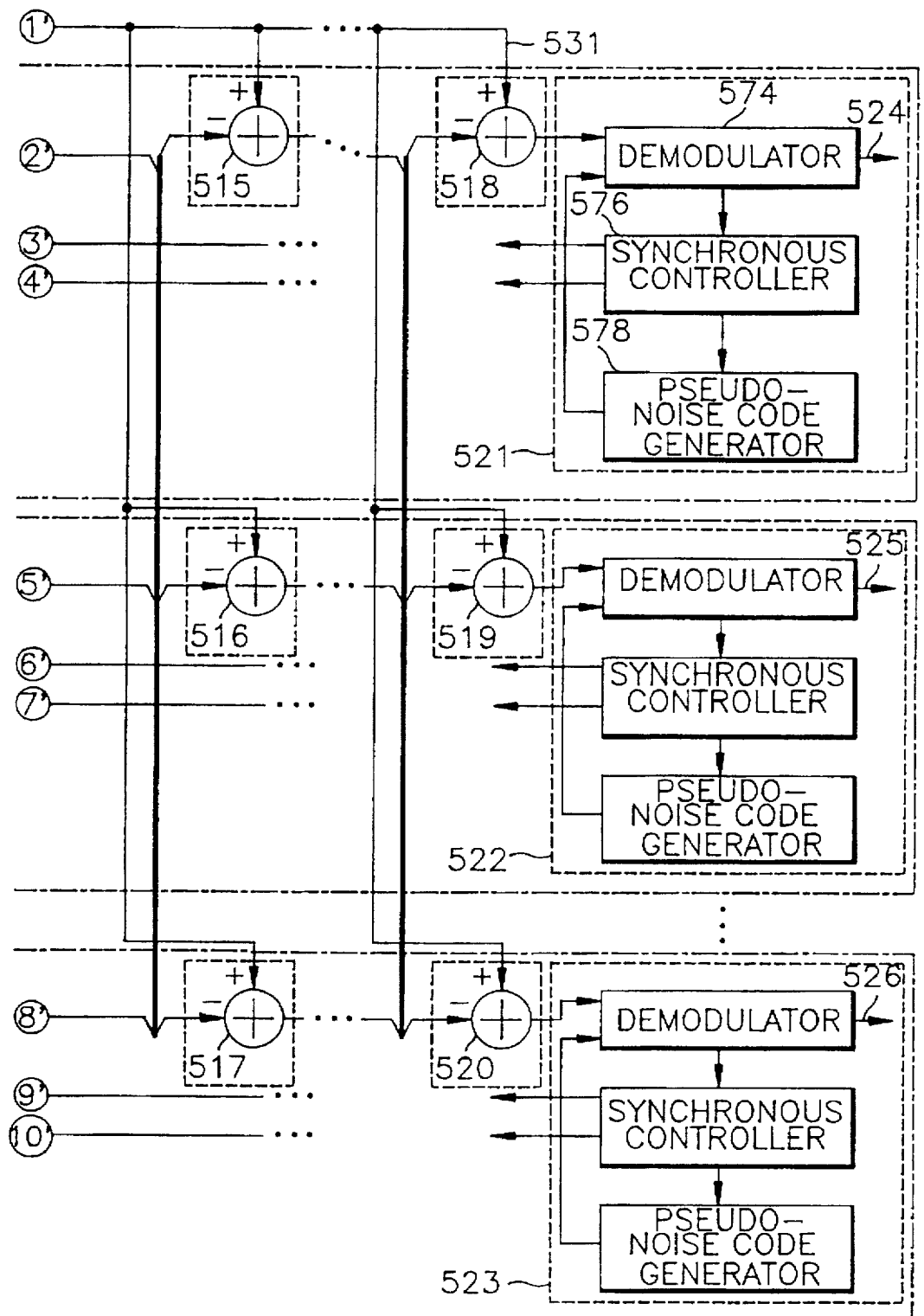

Referring now to FIGS. 5A through 5C, a receiver for a base station in a direct sequence/code division multiple access (DS/CDMA) cellular system constructed according to the principles of the present invention is shown. The receiver of FIGS. 5A through 5C has n channels to extract data transmitted from n mobile stations. A mixed signal r(t) is received by the base station from the n mobile stations and may be a signal of an intermediate frequency band, or a signal of a baseband. In either case, the signal r(t) is represented by:

$$m1(t) = \sqrt{p1(t)}\ d1(t)C1(t) \qquad (1)$$

$$m2(t) = \sqrt{p2(t)}\ d2(t)C2(t) \qquad (2)$$

$$mi(t) = \sqrt{pi(t)}\ di(t)Ci(t) \qquad (3)$$

$$mn(t) = \sqrt{pn(t)}\ dn(t)Cn(t) \qquad (4)$$

$$r(t) = \sum_{i=1}^{n} mi(t) = \sum_{i=1}^{n} \sqrt{pi(t)}\ di(t)Ci(t) \qquad (5)$$

where mi(t) represents a signal from the i-th mobile station, $\sqrt{pi(t)}$ represents the strength of the signal from the i-th mobile station, di(t) represents baseband data from the i-th mobile station, and Ci(t) represents the pseudo-noise code from the i-th mobile station.

The base station accommodates n channels and has n receivers to demodulate and output data signals 524–526 of the n channels. Each receiver includes n stages of subreceivers and (n-1) stages of interference rejectors.

For example, a receiver 502 of the first channel has subreceivers 506, 512 and 521 of n stages, and interference rejectors 509, 515 and 518 of (n-1) stages. A receiver 503 of the second channel has subreceivers 507, 513 and 522 of n stages, and interference rejectors 510, 516 and 519 of (n-1) stages. A receiver 504 of the n-th channel has subreceivers 508, 514 and 523 of n stages, and interference rejectors 511, 517 and 520 of (n-1) stages. Note that in FIGS. 5A through 5C, the subreceivers for the (n-1)-th stage are not shown.

Each subreceiver of receivers 502–504 implements the same operation as the receivers 402–404 of FIG. 4, except for a few points. The subreceivers 506–508 of the first stage through the subreceivers of the (n-1)-th stage (not shown) have the same structure and perform the same operation. The subreceivers 521–523 of the n-th stage are similar in operation to the subreceivers of the first through (n-1)-th stages.

Interference rejectors 509–511, 515–517 and 518–520 of each channel reject signal components of mixed signals 528, 530 and 531 delayed through delay units 527 and 529 of all channels, except for signal components of their own channel.

Each subreceiver of the first through (n-1)-th stages has a demodulator, a re-modulator, a synchronous controller, a pseudo-noise code generator, a delay unit and a switching unit. Subreceivers 521–523 of the n-th stage have only a demodulator, a synchronous controller and a pseudo-noise code generator. To classify the subreceivers according to channel and stage, a symbol [CHi-Dk] is used in the following description, where i represents the channel and k represents the stage. For instance, a demodulator [CH1-D1] represents the demodulator in the subreceiver of the first channel and the first stage.

Also, a pseudo-noise code generator [CHi-Dk] generates a pseudo-noise code having a phase that leads the pseudo-noise code generated by a pseudo-noise code generator [CHi-D(k+1)] by a processing gain. For example, within the receiver 502 of the first channel, the pseudo-noise code generator [CH1-D1] 548 of first stage subreceiver 506 generates a pseudo-noise code 549 having a phase that leads a pseudo-noise code 566 generated by pseudo-noise code generator [CH1-D2] 565 of second stage subreceiver 512 by a processing gain. The pseudo-noise code generator [CH1-Dk] 578 of n-th stage subreceiver 521 generates a pseudo-noise code having a phase that lags behind a pseudo-noise code generated by a pseudo-noise code generator [CH1-D(k-1)] of the (k-1)-th stage subreceiver (not shown) by the processing gain.

During operation of first stage subreceiver 506 of the first channel, the mixed signal r(t) is provided to a demodulator [CH1-D1] 536. Demodulator [CH1-D1] 536 performs signal processing using the mixed signal r(t) and a reference pseudo-noise code 549 generated from pseudo-noise code generator [CH1-D1] 548.

Demodulator [CH1-D1] 536 includes a de-spreading unit, an initial synchronizer, a synchronous tracer and a baseband data demodulator. The de-spreading unit converts a spread signal into a baseband signal. The initial synchronizer adjusts synchronization between a signal component of the first channel out of the mixed signal r(t) and the reference pseudo-noise code 549 generated from pseudo-noise code generator [CH1-D1] 548 within one chip code. Once the initial synchronization is established, the synchronous tracer continues to maintain the code synchronization within one chip and more precisely adjusts the code synchronization, and the baseband data demodulator within demodulator [CH1-D1] 536 begins to demodulate the baseband data.

A synchronous controller [CH1-D1] 543 monitors the results of the de-spreading unit, the initial synchronizer and the synchronous tracer of demodulator [CH1-D1] 536 and controls the speed at which reference pseudo-noise code 549 is generated by controlling the clock of pseudo-noise code generator [CH1-D1] 548.

Two signals are provided to pseudo-noise code generator [CH1-D1] 548. A signal 561 is provided to pseudo-noise code generator [CH1-D1] 548 from a synchronous controller [CH1-D2] 559 as follows.

If the initial synchronization of second stage receiver 512 of the first channel is established, synchronous controller [CH1-D2] 559 generates the signal 561 to enable operation of pseudo-noise code generator [CH1-D1] 548. An initial value of pseudo-noise code generator [CH1-D1] 548 is set such that the pseudo-noise code 549 generated from pseudo-noise code generator [CH1-D1] 548 has a phase that leads the pseudo-noise code 566 generated from pseudo-noise code generator [CH1-D2] 565 by a processing gain. Once pseudo-noise code generator [CH1-D1] 548 is activated by pseudo-noise code generator [CH1-D2] 565 and synchronous controller [CH1-D2] 559, pseudo-noise code generator [CH1-D1] 548 is controlled by synchronous controller [CH1-D1] 543. If synchronization of the second stage receiver 512 of the first channel is not established, synchronous controller [CH1-D2] 559 senses this and interrupts operation of the first stage subreceiver 506.

If the initial synchronization of first stage subreceiver 506 of the first channel is established, demodulator [CH1-D1] 536 demodulates the baseband data. The demodulated data is multiplied by a correlation value (between the mixed signal r(t) and the reference pseudo-noise code 549) generated from an internal matched filter or a correlator of demodulator [CH1-D1] 536, and normalized to the processing gain to be applied to a re-modulator [CH1-D1] 538. Re-modulator [CH1-D1] 538 re-modulates or re-spreads the pseudo-noise code 549 generated from pseudo-noise code generator [CH1-D1] 548.

A delay unit [CH1-D1] 546 delays the pseudo-noise code 549 generated from pseudo-noise code generator [CH1-D1] 548 by the processing gain, and the delay time corresponds to a cross correlation interval at demodulator [CH1-D1] 536. A delayed reference pseudo-noise code 547 is provided to re-modulator [CH1-D1] 538 and multiplied by a signal 537. The resultant signal is a regenerative signal 539 corresponding to a signal component of the first channel extracted from mixed signal r(t).

A switching portion [CH1-D1] 540 generates the regenerative signal 539 as a signal 541 when turned on, and generates "0" when turned off. To turn on switching portion [CH1-D1] 540, two conditions should be satisfied. First, the code synchronization of the second stage subreceiver 512 of the first channel must be established, and secondly, the code synchronization of the first stage subreceiver 506 of the first channel must be established.

Figure 6:
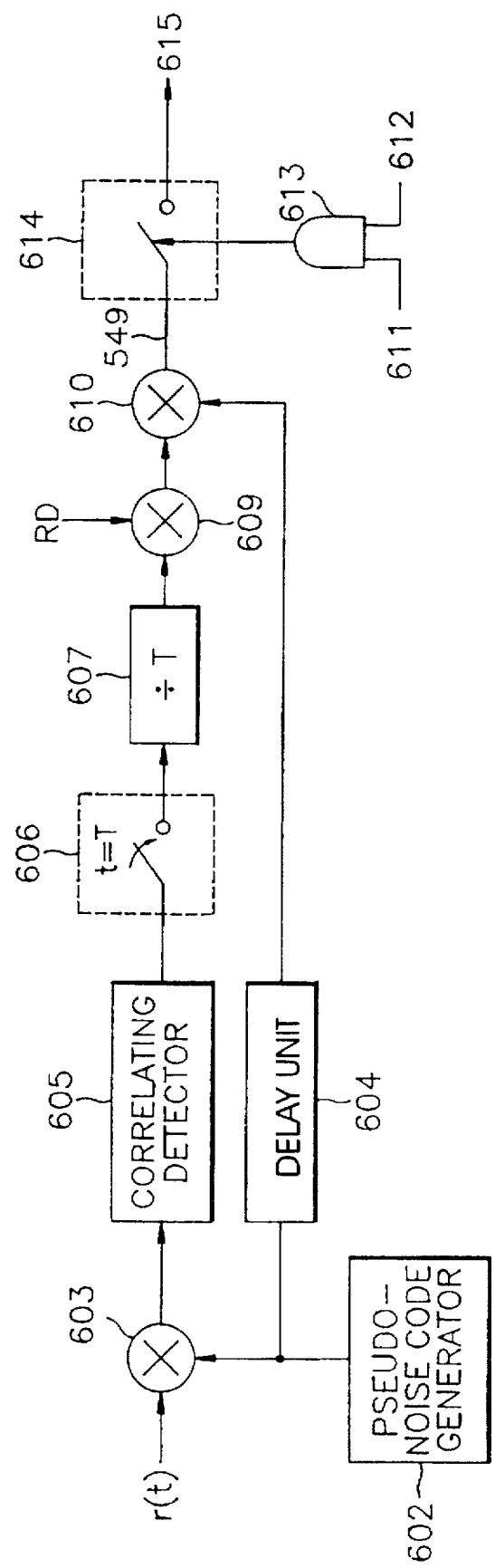
FIG. 6 is a detailed diagram of a circuit for performing correlation, re-modulation and switching operations according to the principles of the present invention.

FIG. 6 is a detailed diagram of a circuit for performing correlation, re-modulation and switching operations according to the principles of the present invention. These operations are performed by the subreceivers of the first through (n-1)-th stages for all channels. Note that the reference numbers in FIG. 6 are used generically and do not correspond to those used in FIGS. 5A through 5C.

Referring to FIG. 6, the signal r(t) is the same signal r(t) of FIG. 5. The signal r(t) is mixed in a mixer 603 with the output of a pseudo-noise code generator 602. The mixed signal is then supplied to a correlating detector 605 and integrated. Thus, the correlation between channels is obtained. The integrated output is passed through a switch 606 at a time T and normalized in a block 607 to the time T. The normalized output is multiplied in a mixer 609 by demodulated data RD. The output of mixer 609 is multiplied in a mixer 610 by a pseudo-noise code delayed through a delay unit 604 to generate a spread signal. The spread signal 549, which is output from mixer 610, is a signal regenerating a spread signal of a corresponding channel from the signal r(t). This signal is generated as a signal 615 when a switch 614 is turned on. Switch 614 is turned on when signals 611 and 612 input to an AND gate 613 are both at a logic "high" level. When the corresponding subreceiver is code-synchronized, the signals 611 and 612 exhibit a logic "high" level. Signals 611 and 612 respectively correspond to signals 544 and 560 used in the first stage of the first channel of FIGS. 5A through 5C.

As indicated previously, first stage subreceiver 506 of the first channel has the same operation and structure as subreceivers 507–508, 512–514 and 521–523, except that the n-th stage subreceivers 521–523 do not include re-modulators, delay units or switching units. In particular, with reference to FIGS. 5A through 5C, second stage subreceiver 512 of the first channel includes a demodulator [CH1-D2] 552, a re-modulator [CH1-D2] 554, a switching unit [CH1-D2] 556, a synchronous controller [CH1-D2] 559, a delay unit [CH1-D2] 564, and a pseudo-noise code generator [CH1-D2] 565. Correlating signals from second stage subreceiver 512 of the first channel to first stage subreceiver 506 of the same channel, signal 553 corresponds to signal 537, signal 555 corresponds to signal 539, signal 562 corresponds to signal 544, and signal 566 corresponds to signal 549. The n-th stage subreceiver 521 of the first channel includes a demodulator [CH1-Dn] 574, a synchronous controller [CH1-Dn] 576, and a pseudo-noise code generator [CH1-Dn] 578.

In the overall operation of the first channel, the signal 541 generated from switching unit [CH1-D1] 540 of the first stage subreceiver 506 is a signal from the mixed signal r(t) that by prediction corresponds only to the first channel. If the code synchronization of the first stage subreceiver 506 is correct, since the predicted regenerative signal is correct, switching unit [CH1-D1] 540 is turned on and the signal 541 of the first channel is generated. If the code synchronization of the first stage subreceiver 506 is not correct, switching unit [CH1-D1] 540 is turned off to generate "0".

Signals generated from switching units 540, 582 and 584 of first stage subreceivers 506, 507 and 508 of the n channels are conveyed on a bus line 533. Assuming that the first stage subreceivers 506–508 of all the channels are code-synchronized and data of their channels are properly demodulated, the signals conveyed on bus line 533 are signals 541, 583 and 585 regenerated from the receiving signal r(t) by prediction.

When subtracting the regenerative signals 583 and 585 from the signal 528 delayed by the processing gain through delay unit 527, only signal components of the respective channel are obtained. Interference rejectors 509–511 and 515–520 reject all signal components from mixed signal r(t), other than signal components of their own channel. If the first stage subreceivers 506–508 of all the channels are code-synchronized and the regenerative signals 541, 583 and 585 are properly regenerated, interference rejector 509 subtracts a signal 550 from the signal 528 to generate a signal 551. The signal 550 is a regenerative signal of all the channels, except the first channel. Hence, the signal 551 includes signal components of the mixed signal r(t) from only the first channel.

To gain a better understanding of the description above, the processed signals will now be described by a numerical expression. The mixed signal r(t) from each mobile station is represented by the equations (1) to (5), as described above. If the mixed signal r(t) is delayed by a time "T", the signal 528 is represented by:

$$r(t-T) = \sum_{i=1}^{n} mi(t-T) = \sum_{i=1}^{n} \sqrt{pi(t-T)} \; di(t-T)Ci(t-T) \quad (6)$$

Assuming that the correlation between the reference pseudo-noise code of the k-th stage subreceiver of the i-th channel and the mixed signal r(t) is Rir(τ), and the correlation between the reference pseudo-noise code of the k-th stage subreceiver of the i-th channel and a signal component of the j-th channel from the receiving signal r(t) is Rij(τ), the correlation at the first stage subreceiver is then given by:

$$R^1ir(\tau) = \frac{1}{T} \sum_{i=0}^{T-1} Ci(t+\tau)r(t) \quad (7)$$

$$R^1ij(\tau) = \frac{1}{T} \sum_{i=0}^{T-1} Ci(t+\tau)\sqrt{pj(t)} \; dj(t)Cj(t) \quad (8)$$

The signals 537 and 539 respectively generated from demodulator [CH1-D1] 536 and re-modulator [CH1-D1] 538 are as follows, respectively:

$$R^111(\tau) + \sum_{j=2}^{n} R^1j(\tau) \quad (9)$$

$$R^111(\tau)C1(t-T+\tau) + \sum_{j=2}^{n} R^1j(\tau)C1(t-T+\tau) \quad (10)$$

If the code synchronization is correct, since $\tau=0$, and the switching unit [CH1-D1] 540 is turned on, the signal 541 generated from the first stage subreceiver 506 is given by the following equation (11). When the signal is expanded to n channels, the following equations (12), (13) and (14) can be obtained:

$$R^111(0)C1(t-T) + \sum_{j=1}^{n} R^1j(0)C1(t-T), j \neq 1 \quad (11)$$

$$R^122(0)C2(t-T) + \sum_{j=1}^{n} R^12j(0)C2(t-T), j \neq 2 \quad (12)$$

$$R^1ii(0)Ci(t-T) + \sum_{j=1}^{n} R^1ij(0)Ci(t-T), j \neq i \quad (13)$$

$$R^1nr(0)Cn(t-T) + \sum_{j=1}^{n} R^1nj(0)Cn(t-T), j \neq n \quad (14)$$

Equation (11) represents the regenerative signal 541 generated from switching unit [CH1-D 1 ] 540, equation (12) represents the regenerative signal 583 generated from switching unit [CH2-D1] 582, equation (13) represents the regenerative signal generated from switching unit [CHi-D1] of the first stage subreceiver of the i-th channel (not shown), and equation (14) represents the regenerative signal 585 generated from switching unit [CHn-D1] 584.

Equation (13) representing the regenerative signal generated from the switching unit [CHi-D1] of the first stage subreceiver of the i-th channel can also be represented by:

$$R^1ii(0)Ci(t-T) + \sum_{j=1}^{n} R^1ij(0)Ci(t-T) = \quad (15)$$

$$\sqrt{pi} \; di1 \; Ci(t-T) + \sum_{j=1}^{n} R^1ij(0)Ci(t-T)$$

where $$\sqrt{pi} = \frac{1}{T} \sum_{t=0}^{T-1} \sqrt{pi(t)} \; ,$$

and di1 is demodulation data of the first stage subreceiver of the i-th channel.

The signal 551 generated from interference rejector 509 is:

$$\begin{aligned}\text{signal } 551 &= \text{signal } 528 - \text{signal } 550 \quad (16)\\ &= r(t-T) - \\ &\quad \sum_{i=2}^{n} \text{output of switching unit } [CHi-D1]\\ &= \sum_{i=1}^{n} \sqrt{pi(t-T)} \; di(t-T)Ci(t-T) - \\ &\quad \sum_{i=2}^{n} \sqrt{pi} \; di1 Ci(t-T) - \\ &\quad \sum_{i=2}^{n} \sum_{j=1, j\neq i}^{n} R^1ij(0)Ci(t-T)\end{aligned}$$

If $\sqrt{pi(t)}$ is constant when t=T, the following equation (17) is applied, and if di1 is correctly demodulated into the baseband data of the i-th channel, the following equation (18) is applied:

$$\sqrt{pi} \approx \sqrt{pi(t)} \; , t=0, 1, \ldots, T-1 \quad (17)$$

$$di1 \approx di(t), \; t=0, 1, \ldots, T-1 \quad (18)$$

When considering equations (17) and (18), signal 551 of equation (16) is represented as:

$$\sqrt{p1(t-T)} \; d1(t-T)C1(t-T) - \sum_{i=2}^{n} \sum_{j=1, j\neq i}^{n} R^1ij(0)Ci(t-T) \quad (19)$$

The signal 528, in which the mixed signal r(t) represented by equation (5) is delayed, is given by:

$$r(t-T) = \quad (20)$$

$$\sqrt{p1(t-T)} \; d1(t-T)C1(t-T) + \sum_{i=2}^{n} \sqrt{pi(t-T)} \; di(t-T)Ci(t-T)$$

In the first channel, the second term of the equations (19) and (20) functions as interference. As can be seen from equations (19) and (20), the signal 551 passing through interference rejector 509 has a remarkably reduced level of interference as compared to the signal 528 which does not pass through interference rejector 509.

If the signal strength of each mobile station received by the base station is similar to one another, as represented in the following equation (21), the second term of equation (19) becomes a small value which may be neglected. Therefore, second stage subreceiver 512 of the first channel will perform de-spreading, initial synchronization, synchronous tracking and baseband data demodulation only with the signal components of its own channel, and therefore will be stably operated.

$$P1(t) \doteq P2(t) \doteq \ldots \doteq Pn(t) \quad (21)$$

However, if the signal strength of each mobile station received by the base station greatly differs, that is, $$P1(t) << P2(t) << \ldots << Pn(t) \quad (22)$$

and if a signal of a channel having the smaller signal strength does not maintain the code synchronization due to a signal of a channel having the larger signal strength, only the n-th channel subreceiver 508 receiving the signal of the largest power maintains code synchronization, and the other subreceivers 506 and 507 generate "0" since their switching units are turned off. Therefore, under the condition of equation (22), the output of the first stage switching unit [CHi-D1] of each channel is:

$$\begin{cases} \sqrt{pn} \ dn1 \ Cn(t-T) + Pnj(t-T), i = n \\ 0, \quad \text{otherwise} \end{cases} \quad (23)$$

where $$pnj(t-T) = \sum_{j=1}^{n-1} R^1 nj(0)Cn(t-T), j \neq n$$

Therefore, only the n-th channel component is rejected by interference rejectors 509 and 510. In the second stage subreceivers 512–514, since the n-th and (n-1)-th subreceivers establish the code synchronization, the output of switching units [CHi-D2] is:

$$\sqrt{pn} \ dn2 \ Cn(t-2T) + Pnj(t-2T), \text{ if } i = n \quad (24)$$

$$\sqrt{P(n-1)} \ d(n-1)2C(n-1)(t-2T) + P(n-1)j(t-2T),$$

$$j \neq n, n-1 \text{ if } i = n-1$$
$$0 \quad \text{otherwise}$$

where p(n-1)j(t-2T)

$$= \sum_{j=1}^{n-2} R^2(n-1)j(0)C(n-1)(t-2T) + \beta(n-1)(t-2T) \quad (25)$$

$$\beta(n-1)i(t-2T) = \sum_{t=T}^{2T-1} Rnj(t-T)C(n-1)(t-T) \quad (26)$$

The above equations (23), (24) and (26) decreases or disappears as the stage of the subreceiver of each channel increases. That is, with an increase in the stage of the subreceiver of each channel, all the channels establish synchronization, and the regenerative signals are well tuned. In the subreceivers of the n-th (i.e., final) stage, only a signal component of their own channel is accurately regenerated.

A signal generated from the (n-1)-th interference rejector supplied to the n-th subreceiver of the i-th channel is given by:

$$\sqrt{pi(t-(n-1)T)} \ di(t-(n-1)T)Ci(t-(n-1)T) - \quad (27)$$

$$pi1(t-(n-1)T), i \neq 1$$

In equation (27), the first term is a signal component of the corresponding i-th channel, and the second term is a correlation term between a signal component of the first channel from the mixed signal r(t) and the reference pseudo-noise code of the i-th channel. Under the condition of equation (22), when passing through the subreceivers of the (n-1)-th stage, a regenerative signal in which all the channel components, except the first channel, are rejected is generated. Therefore, equation (27) has only a signal component of its own channel which is more suitable for code synchronization and data demodulation than the original mixed signal r(t).

In the case that the n-th stage subreceiver 521 of the first channel generates the signal given by equation (27) under the condition of equation (22), since the second term of equation (27) is a relatively smaller than the first term, demodulator [CH1-Dn] 574 of subreceiver 521 accurately establishes code synchronization through the de-spreading, initial synchronization and synchronous tracking operations. Therefore, the data transmitted from a mobile station corresponding to the first channel is demodulated to the signal 524.

It should be noted that the explanation given above with reference to the first channel also applies to the other channels as well.

Equation (22) represents the worst case scenerio in which the signal strength of each mobile station differs entirely. If the demodulation/re-modulation system according to the present invention is used, as shown in FIG. 5, even the signal of the mobile station received having the minimum signal strength can be extracted when the signal reaches the n-th stage subreceiver. Furthermore, if the inventive demodulation/re-modulation system of the present invention is used, power control can be easily achieved even under the condition of equation (22) or the following equation (28) or (29) in comparison with the direct sequence/code division multiple access (DS/CDMA) system having a conventional receiver structure. The channel capacity of the direct sequence/code division multiple access (DS/CDMA) cellular system constructed according to the principles of the present invention can therefore be increased.

$$pi \geq pj, i \neq j \quad (28)$$

$$pi \gg Pj, i \neq j \quad (29)$$

In the direct sequence/code division multiple access (DS/CDMA) cellular system of the present invention, the receiver structure of the base station may be altered without using the demodulation/re-modulation system having n stages, as shown in FIG. 5. For example, even if subreceivers of two or three stages are used, performance is improved. Actually, when testing the receiver having just two stages, the inventive receiver structure of the base station of the direct sequence/code division multiple access (DS/CDMA) cellular system showed improved performance, regardless of whether the signal strength of the mobile stations was similar or different.

In the code division multiple access (CDMA) system to which the inventive demodulation/remodulation system is applied, the receiver of the base station sequentially performs demodulation and re-modulation and rejects the signal components of other channels, thereby extracting the signal components of all the mobile stations. Even if the power sent from each mobile station differs from one another, power control is easily achieved. Therefore, performance deterioration, which is one of the disadvantages of the code division multiple access (CDMA) system, due to an increase in interference as the number of channels increases can be solved, and many channels can be accommodated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments failing within the scope of the appended claims.

What is claimed is:

1. A receiving apparatus of a base station in a code division multiple access system for extracting a signal of a channel corresponding to one of a plurality of mobile stations from a received signal in which signals transmitted from said plurality of mobile stations are mixed, said receiver comprising:

pseudo-noise code generating means for generating a pseudo-noise code for each receiving stage of said channel corresponding to said one of said plurality of mobile stations;

demodulating means for sequentially demodulating said received signal to generate baseband data for each said receiving stage in synchronization with said pseudo-noise code; and re-modulating means for re-modulating said baseband data to generate said signal of said channel corresponding to said one of said plurality of mobile stations in synchronization with a delayed pseudo-noise code.

2. The receiving apparatus as claimed in claim 1, further comprising channel interference signal rejecting means connected between said re-modulating means of a corresponding receiving stage and said demodulating means of a next receiving stage, for rejecting signals of channels other than said channel corresponding to said one of said plurality of mobile stations.

3. The receiving apparatus as claimed in claim 1, further comprising switching means for providing said signal generated from said re-modulating means of a corresponding receiving stage to said demodulating means of a next receiving stage.

4. The receiving apparatus as claimed in claim 1, further comprising synchronizing signal generating means for generating a synchronizing signal for each said receiving stage when said received signal is synchronized with said pseudo-noise code of each said receiving stage.

5. The receiving apparatus as claimed in claim 4, wherein said synchronizing signal for said corresponding receiving stage controls a speed of generation of said pseudo-noise code of said corresponding receiving stage by said pseudo-noise code generating means.

6. The receiving apparatus as claimed in claim 5, wherein said pseudo-noise code generating means of said corresponding receiving stage is operated in response to said synchronizing signal generated from said synchronizing signal generating means of a next receiving stage.

7. The receiving apparatus as claimed in claim 3, wherein said switching means of said corresponding receiving stage is operated in response to a first synchronizing signal generated from a first synchronizing signal generator of said corresponding receiving stage, and further in response to a second synchronizing signal generated from a second synchronizing signal generator of said next receiving stage.

8. The receiving apparatus as claimed in claim 6, further comprising switching means for providing said signal generated from said re-modulating means of said corresponding receiving stage to said demodulating means of said next receiving stage, said switching means being operated in response to said synchronizing signal generated from said synchronizing signal generating means of said corresponding receiving stage and further in response to said synchronizing signal generated from said synchronizing signal generating means of said next receiving stage.

9. The receiving apparatus as claimed in claim 6, wherein said pseudo-noise code generating means of said corresponding receiving stage is operated further in response to said synchronizing signal generated from said synchronizing signal generating means of said corresponding receiving stage.

10. The receiving apparatus as claimed in claim 2, wherein said channel interference signal rejecting means subtracts from said received signal, said signals of channels other than said channel corresponding to said one of said plurality of mobile stations.

11. A receiving apparatus of a base station in a code division multiple access system for extracting a signal of a channel corresponding to a mobile station from a received signal in which signals transmitted from a plurality of mobile stations are mixed, said receiver comprising:

control signal generating means for generating a control signal corresponding to each receiving stage of a plurality of channels, each one of said plurality of channels having a plurality of receiving stages;

a plurality of channel signal regenerating means for sequentially regenerating signals of said plurality of channels from said received signal in response to said control signal, said plurality of channel signal regenerating means comprising: demodulating means for sequentially demodulating said received signal to generate baseband data for each said receiving stage when said received signal is synchronized with said control signal; and re-modulating means for re-modulating said baseband data in response to a delayed control signal; and channel signal interference rejecting means connected between said plurality of channel signal regenerating means, for rejecting signals of said plurality of channels other than said channel corresponding to said mobile station from said signals regenerated from one of said plurality of channel signal regenerating means.

12. The receiving apparatus as claimed in claim 11, wherein said control signal generating means comprises:

pseudo-noise code generating means for generating a pseudo-noise code for each said receiving stage of said plurality of channels; and synchronizing signal generating means for generating a synchronizing signal for each said receiving stage when said received signal is synchronized with said pseudo-noise code for each said receiving stage.

13. The receiving apparatus as claimed in claim 12, wherein said pseudo-noise code generating means controls a speed of generation of said pseudo-noise code in response to said synchronizing signal generated from said synchronizing signal generating means.

14. The receiving apparatus as claimed in claim 12, wherein said pseudo-noise code generating means controls a speed of generation of said pseudo-noise code for a corresponding receiving stage according to said synchronizing signal for a next receiving stage.

15. The receiving apparatus as claimed in claim 11, further comprising switching means for providing said baseband data of each said receiving stage generated from said re-modulating means to said channel signal interference rejecting means connected to said demodulating means of a next receiving stage in response to a synchronizing signal generated from a synchronizing signal generating means.

16. The receiving apparatus as claimed in claim 12, further comprising switching means for providing said baseband data of each said receiving stage generated from said re-modulating means to said channel signal interference rejecting means connected to said demodulating means of a next receiving stage in response to said synchronizing signal generated from said synchronizing signal generating means.

17. The receiving apparatus as claimed in claim 13, further comprising switching means for providing said baseband data of each said receiving stage generated from said re-modulating means to said channel signal interference rejecting means connected to said demodulating means of a next receiving stage in response to said synchronizing signal generated from said synchronizing signal generating means.

18. A receiving apparatus of a base station in a code division multiple access system for extracting a signal of a channel corresponding to each mobile station from a received signal in which signals transmitted from said plurality of mobile stations are mixed, said receiver comprising:
- pseudo-noise code generating means for generating a pseudo-noise code for each receiving stage of a plurality of channels, each one of said plurality of channels having a plurality of receiving stages;
- demodulating means for sequentially demodulating said received signal to generate baseband data for each said receiving stage in synchronization with said pseudo-noise code;
- re-modulating means for re-modulating said baseband data to generate said signal of said channel corresponding to each said mobile station by multiplying a delayed pseudo-noise code by said baseband data; and
- interference rejecting means connected between said re-modulating means of a corresponding receiving stage and said demodulating means of a next receiving stage, for rejecting an interference component caused by cross correlation with other channels from said signal of said channel corresponding to each said mobile station generated from said re-modulating means.

19. The receiving apparatus as claimed in claim 18, further comprising synchronizing control signal generating means for generating a synchronizing control signal for each said receiving stage when said received signal is synchronized with said pseudo-noise code for each said receiving stage, respectively.

20. The receiving apparatus as claimed in claim 19, further comprising switching means for providing said signal of said channel corresponding to each said mobile station generated from said re-modulating means to said interference rejecting means, in response to said synchronizing control signal for a corresponding receiving stage and further in response to said synchronizing control signal for a next receiving stage.

21. The receiving apparatus as claimed in claim 20, wherein said pseudo-noise code generating means of said corresponding receiving stage of each one of said plurality of channels varies a speed of generation of said pseudo-noise code in response to said synchronizing control signal for said corresponding receiving stage and further in response to said synchronizing control signal for said next receiving stage.

22. A signal receiving method for a receiving apparatus of a base station in a code division multiple access system, said receiving apparatus extracting a signal of a channel corresponding to each mobile station from a received signal in which signals transmitted from a plurality of mobile stations are mixed, said method comprising the steps of:
- sequentially demodulating said received signal to generate baseband data in synchronization with a pseudo-noise code corresponding to each receiving stage of a plurality of channels, each one of said plurality of channels having a plurality of receiving stages;
- re-modulating said baseband data to generate said signal of said channel corresponding to each said mobile station by multiplying a delayed pseudo-noise code by said baseband data; and
- rejecting an interference component caused by cross correlation with other channels from said signal of said channel corresponding to each said mobile station generated in said re-modulating step.

23. A receiving apparatus of a base station in a code division multiple access system, said receiving apparatus comprising:
- pseudo-noise code generating means for generating a pseudo-noise code for each receiving stage of a plurality of channels corresponding respectively to a plurality of mobile stations transmitting signals to said base station, each one of said plurality of channels having a plurality of receiving stages;
- demodulating means for demodulating said signals transmitted to said base station from said plurality of mobile stations to generate baseband data for each said receiving stage in synchronization with said pseudo-noise code;
- re-modulating means for re-modulating said baseband data in synchronization with a delayed pseudo-noise code to output regenerative signals corresponding to each one of said, plurality of mobile stations.

24. The receiving apparatus as claimed in claim 23, further comprising channel interference signal rejecting means connected between said re-modulating means of a corresponding receiving stage and said demodulating means of a next receiving stage, for rejecting signals of said plurality of channels other than one of said plurality of channels corresponding to an applicable one of said plurality of mobile stations.

25. The receiving apparatus as claimed in claim 23, further comprising switching means for providing said regenerative signal output from said re-modulating means of a corresponding receiving stage to said demodulating means of a next receiving stage.

26. The receiving apparatus as claimed in claim 24, further comprising switching means for providing said regenerative signal output from said re-modulating means of said corresponding receiving stage to said demodulating means of said next receiving stage.

27. The receiving apparatus as claimed in claim 23, further comprising synchronizing signal generating means for generating a synchronizing signal for each said receiving stage when said signals transmitted to said base station from said plurality of mobile stations are synchronized with said pseudo-noise code of each said receiving stage.

28. The receiving apparatus as claimed in claim 27, wherein said synchronizing signal for a corresponding receiving stage controls a speed of generation of said pseudo-noise code of said corresponding receiving stage by said pseudo-noise code generating means.

29. The receiving apparatus as claimed in claim 28, wherein said pseudo-noise code generating means of said corresponding receiving stage is operated in response to said synchronizing signal generated from said synchronizing signal generating means of a next receiving stage.

30. The receiving apparatus as claimed in claim 24, further comprising synchronizing signal generating means for generating a synchronizing signal for each said receiving stage when said signals transmitted to said base station from said plurality of mobile stations are synchronized with said pseudo-noise code of each said receiving stage.

31. The receiving apparatus as claimed in claim 30, wherein said synchronizing signal for said corresponding receiving stage controls a speed of generation of said pseudo-noise code of said corresponding receiving stage by said pseudo-noise code generating means.

32. The receiving apparatus as claimed in claim 25, further comprising synchronizing signal generating means for generating a synchronizing signal for each said receiving stage when said signals transmitted to said base station from said plurality of mobile stations are synchronized with said pseudo-noise code of each said receiving stage.

33. The receiving apparatus as claimed in claim 32, wherein said synchronizing signal for said corresponding receiving stage controls a speed of generation of said pseudo-noise code of said corresponding receiving stage by said pseudo-noise code generating means.

* * * * *